(12) United States Patent
Ono

(10) Patent No.: US 11,214,169 B2
(45) Date of Patent: Jan. 4, 2022

(54) BATTERY SYSTEM

(71) Applicant: Toyota Jidosha Kabushiki Kaisha, Toyota (JP)

(72) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/250,386

(22) Filed: Jan. 17, 2019

(65) Prior Publication Data
US 2019/0225109 A1    Jul. 25, 2019

(30) Foreign Application Priority Data

Jan. 19, 2018    (JP) ............................ JP2018-007377

(51) Int. Cl.
| | | |
|---|---|---|
| *B60L 58/19* | (2019.01) | |
| *B60L 58/12* | (2019.01) | |
| *H02J 7/00* | (2006.01) | |
| *B60L 3/00* | (2019.01) | |
| *H02J 7/14* | (2006.01) | |
| *H01M 10/48* | (2006.01) | |

(52) U.S. Cl.
CPC ............. *B60L 58/19* (2019.02); *B60L 3/0015* (2013.01); *B60L 3/0046* (2013.01); *B60L 3/0092* (2013.01); *B60L 58/12* (2019.02); *H02J 7/0024* (2013.01); *B60L 2240/36* (2013.01); *H01M 10/482* (2013.01); *H02J 7/0049* (2020.01); *H02J 7/1438* (2013.01)

(58) Field of Classification Search
CPC .......... B60L 58/21; B60L 58/19; B60L 58/15; B60L 58/10; B60L 58/22; H02J 7/0016; H02J 7/0024
See application file for complete search history.

(56) References Cited

U.S. PATENT DOCUMENTS

| | | | | |
|---|---|---|---|---|
| 5,418,402 | A | * 5/1995 | Fujiwara ............... | H02J 7/1423 307/10.1 |
| 2008/0143298 | A1 | * 6/2008 | Yoshida ............... | H02J 7/0026 320/136 |
| 2009/0206679 | A1 | * 8/2009 | King ..................... | B60L 58/26 307/125 |
| 2010/0261048 | A1 | 10/2010 | Kim et al. | |

(Continued)

FOREIGN PATENT DOCUMENTS

| | | |
|---|---|---|
| EP | 1157873 A2 | 11/2001 |
| JP | 2013081316 A | 5/2013 |

(Continued)

*Primary Examiner* — David V Henze-Gongola
*Assistant Examiner* — Tarikh Kanem Rankine
(74) *Attorney, Agent, or Firm* — Dinsmore & Shohl LLP

(57) ABSTRACT

A battery system including: a plurality of battery modules; a plurality of switches arranged in a circuit including the plurality of the battery modules, the plurality of the switches being configured to switch connection of the battery modules between a series state and a parallel state; a storage device that stores at least one abnormality pattern; and a control device configured to: i) control switching of each of the plurality of the switches; and ii) control switching of the switches other than the predetermined switch such that the battery modules rue not in a short-circuited state using the abnormality pattern when the predetermined switch is unable to be controlled.

5 Claims, 8 Drawing Sheets

| | | SWITCHING PATTERN A | | | | SWITCHING PATTERN B | | | |
|---|---|---|---|---|---|---|---|---|---|
| SWITCHING RELAY | | R1 | R2 | R3 | BATTERY STATE | R1 | R2 | R3 | BATTERY STATE |
| STUCK CLOSED (ON) | R1 | - | OFF | ON | PARALLEL | - | OFF | OFF | FIRST SINGLE-CONNECTED |
| | R2 | OFF | - | OFF | SERIES | | NO | | |
| | R3 | ON | OFF | - | PARALLEL | OFF | OFF | - | SECOND SINGLE-CONNECTED |
| STUCK OPEN (OFF) | R1 | - | ON | OFF | SERIES | - | OFF | ON | SECOND SINGLE-CONNECTED |
| | R2 | ON | - | ON | PARALLEL | OFF | - | ON | SECOND SINGLE-CONNECTED |
| | R3 | OFF | ON | - | SERIES | ON | OFF | - | FIRST SINGLE-CONNECTED |

(56) References Cited

U.S. PATENT DOCUMENTS

| | | | |
|---|---|---|---|
| 2011/0208567 A9* | 8/2011 | Roddy | G06Q 10/20 |
| | | | 705/7.41 |
| 2014/0077595 A1* | 3/2014 | Kakuya | H02J 7/0024 |
| | | | 307/24 |
| 2014/0287278 A1* | 9/2014 | Despesse | B60L 58/21 |
| | | | 429/7 |
| 2015/0207347 A1* | 7/2015 | Hori | G01R 31/396 |
| | | | 320/118 |
| 2017/0201102 A1* | 7/2017 | Hikosaka | H02J 7/02 |

FOREIGN PATENT DOCUMENTS

| | | |
|---|---|---|
| JP | 2015-126688 A | 7/2015 |
| JP | 2016-171637 A | 9/2016 |

\* cited by examiner

| STATE OF VEHICLE | SMR | SWITCHING RELAY (NOT STUCK) | | | BATTERY STATE |
| --- | --- | --- | --- | --- | --- |
| | | R1 | R2 | R3 | |
| DURING TRAVELING | ON | ON | OFF | ON | PARALLEL |
| LEFT-ALONE PERIOD | OFF | OFF | ON | OFF | SERIES |
| DURING EXTERNAL CHARGING | ON | OFF | ON | OFF | SERIES |

| STATE OF VEHICLE | SMR | SWITCHING RELAY (STUCK) | | |
|---|---|---|---|---|
| | | R1 | R2 | R3 |
| DURING TRAVELING | ON | STUCK-STATE PATTERN | | |
| LEFT-ALONE PERIOD | OFF | STUCK-STATE PATTERN | | |
| DURING EXTERNAL CHARGING | ON | STUCK-STATE PATTERN | | |

FIG. 9

| SWITCHING RELAY | | SWITCHING PATTERN | | | | |
| --- | --- | --- | --- | --- | --- | --- |
| | | R1 | R2 | R3 | BATTERY STATE | CHARGING FACILITY |
| STUCK CLOSED (ON) | R1 | - | OFF | ON | PARALLEL | CHARGING IN PARALLEL |
| | R2 | OFF | - | OFF | SERIES | CHARGING IN SERIES |
| | R3 | ON | OFF | - | PARALLEL | CHARGING IN PARALLEL |
| STUCK OPEN (OFF) | R1 | - | ON | OFF | SERIES | CHARGING IN SERIES |
| | R2 | ON | - | ON | PARALLEL | CHARGING IN PARALLEL |
| | R3 | OFF | ON | - | SERIES | CHARGING IN SERIES |

FIG. 10

| SWITCHING RELAY | | SWITCHING PATTERN A | | | | SWITCHING PATTERN B | | | |
|---|---|---|---|---|---|---|---|---|---|
| | | R1 | R2 | R3 | BATTERY STATE | R1 | R2 | R3 | BATTERY STATE |
| STUCK CLOSED (ON) | R1 | - | OFF | ON | PARALLEL | - | OFF | OFF | FIRST SINGLE-CONNECTED |
| | R2 | OFF | - | OFF | SERIES | | | | NO |
| | R3 | ON | OFF | - | PARALLEL | OFF | OFF | - | SECOND SINGLE-CONNECTED |
| STUCK OPEN (OFF) | R1 | - | ON | OFF | SERIES | - | OFF | ON | SECOND SINGLE-CONNECTED |
| | R2 | ON | - | ON | PARALLEL | OFF | - | ON | SECOND SINGLE-CONNECTED |
| | R3 | OFF | ON | - | SERIES | ON | OFF | - | FIRST SINGLE-CONNECTED |

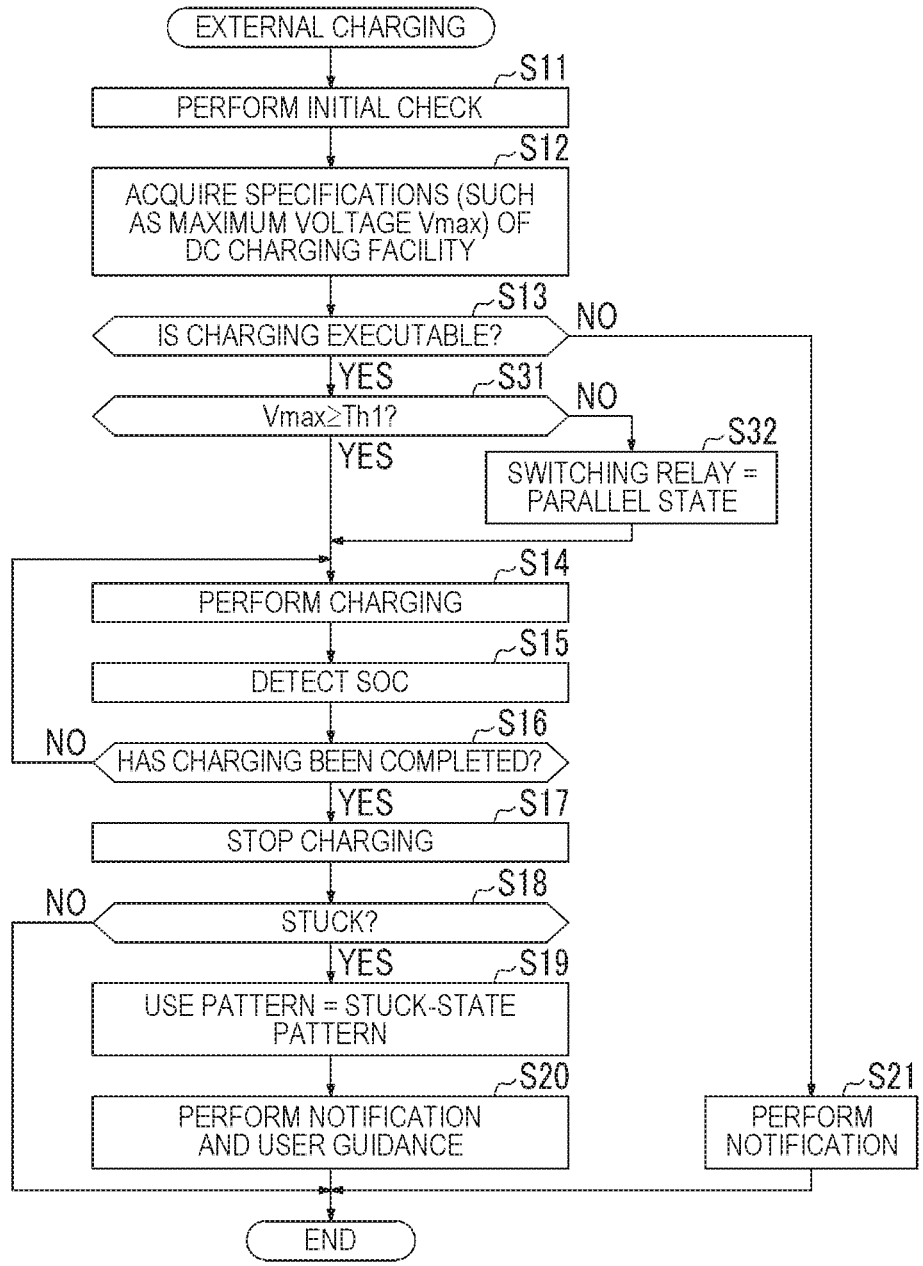

BATTERY SYSTEM

CROSS-REFERENCE TO RELATED APPLICATION

This application claims priority to Japanese Patent Application No. 2018-007377 filed on Jan. 19, 2018, incorporated herein by reference in its entirety.

BACKGROUND

1. Technical Field

The disclosure relates to a battery system and amore particularly to a technique of switching a connection mode of a plurality of battery modules using a plurality of switches.

2. Description of Related Art

Japanese Unexamined Patent Application Publication No. 2013-81316 (JP 2013-81316 A) discloses a power supply device in which a connection mode (series/parallel) of a plurality of battery modules can be switched depending on ON-OFF states of a plurality of switches and a control device thereof. The control device described in JP 2013-81316 A is configured to switch the connection mode of a plurality of battery modules based on a temperature, a state of charge (SOC), or the like of the power supply device.

SUMMARY

Switching control of a switch which is used in a battery system may be unable to be executed. For example, when an electromagnetic mechanical relay is used as a switch and an operation of switching a switch in an open state to a closed state or switching a switch in a closed state to an open state (hereinafter referred to as a "switching operation") is frequently performed, deterioration of the relay is likely to progress. When deterioration of a relay progresses, the relay may become stuck in the closed state (hereinafter referred to as "stuck closed") or may become stuck in the open state (hereinafter referred to as "stuck open"). When a relay is stuck closed or is stuck open, a control device cannot control switching of the relay.

JP 2013-81316 A does not disclose a countermeasure against a case in which switching control of a switch is not possible, and it is difficult to continuously use the battery system when switching control of a switch is not possible.

The disclosure provides a battery system that can make a plurality of battery modules usable using other switches when switching control of a switch which is used to switch a connection mode of a plurality of battery modules cannot be executed.

An aspect of the present disclosure relates to a battery system including: a plurality of battery modules; a plurality of switches arranged in a circuit including the plurality of the battery modules, the plurality of the switches being configured to switch connection of the plurality of the battery modules between a series state and a parallel state; a storage device that stores at least one abnormality pattern, the abnormality pattern is a switching plan of each of switches other than a predetermined switch which becomes unable to be controlled, the switching plan representing which of an open state and a closed state each of the switches other than the predetermined switch is switched to; and a control device configured to: i) control switching of each of the plurality of the switches; and ii) control switching of the switches other than the predetermined switch such that the plurality of the battery modules are not in a short-circuited state using the abnormality pattern when the predetermined switch is unable to be controlled, wherein: the series state is a state in which the plurality of the battery modules are connected in series, the parallel state is a state in which the plurality of the battery modules are connected in parallel, and the short-circuited state is a state in which terminals of at least one of the plurality of the battery modules are short-circuited.

In the following description, the switches which are included in the battery system may be referred to as "ON-OFF switches," The predetermined switch in an abnormality pattern may be referred to as a "target switch." The target switch may be a part of the plurality of ON-OFF switches, for example, one switch or two or more switches. For example, in a battery system including six ON-OFF switches, when two switches cannot be controlled, the abnormality pattern may indicate each of four other switches is to be switched to the open state or the closed state.

When switching, control of one of the plurality of ON-OFF switches which is used for the battery system which cannot be controlled, the battery modules may be short-circuited depending on ON-OFF states of the ON-OFF switch which cannot be controlled (hereinafter referred to as an "abnormal switch") and ON-OFF switches that are not abnormal switches (hereinafter referred to as "normal switches"). Accordingly, when information indicating how normal switches are to be controlled when switching control of some ON-OFF switches cannot be controlled is not prepared, it is difficult to continuously use the battery system.

In the battery system, an abnormality pattern is stored in the storage device, and the electronic control unit is configured to control switching of other switches such that the plurality of battery modules are not short-circuited using the abnormality pattern when a target switch in the plurality of ON-OFF switches cannot be controlled. Accordingly, in the battery system, even when a target switch in the plurality of ON-OFF switches cannot be controlled, it is possible to make the plurality of battery modules usable using other switches (normal switches).

In the above aspect, the storage device may store the following switching patterns as the abnormality patterns: i) a switching pattern for each of situations in which one of the plurality of the switches is an open abnormal switch, the open abnormal switch being a switch which is in an open state and is unable to be controlled; and ii) a switching pattern for each of situations in which one of the plurality of the switches is a closed abnormal switch, the closed abnormal switch being a switch which is in a closed state and is unable to be controlled, wherein the control device may be configured to, when any one of the plurality of the switches is unable to be controlled, control switches other than the one of the plurality of the switches which is unable to be controlled using a switching pattern selected from the switching patterns stored in the storage device.

According to this configuration, even when a certain ON-OFF switch included in the battery system cannot be controlled to switch to the open state or the closed state, it is possible to appropriately control normal switches using the abnormality pattern corresponding to the state (the open state/closed state) of the abnormality switch.

The electronic control unit may, for example, detect whether any ON-OFF switch in the plurality of ON-OFF switches is not able to be controlled or not, and detect which state of the open state and the closed state the uncontrollable ON-OFF switch is in, and the electronic control unit may select one switching pattern from a plurality of switching patterns using the detection result. In the following description, detecting whether any ON-OFF switch in the plurality of ON-OFF switches is not able to be controlled or not and detecting which state of the open state and the closed state the uncontrollable ON-OFF switch is in may be referred to as "switch abnormality determination."

In the above aspect, the plurality of the switches may be configured to switch the connection of the plurality of the battery modules to a single-connected state in addition to the series state and the parallel state; the storage device may store a switching pattern, in which the plurality of the battery modules are in the single-connected state, as the abnormality pattern; and the single-connected state is a state in which only one battery module of the plurality of battery modules forms a closed circuit in the circuit.

In the battery system, a plurality of ON-OFF switches are provided to be switchable to a series state and a parallel state. Accordingly, when there is no abnormal switch, a plurality of battery modules can be set to one of the series state and the parallel state using the ON-OFF switches. In the following description, power storage assemblies in which a plurality of battery modules included in the battery system are connected in series and in parallel may be referred to as a "series power storage assembly" and a "parallel power storage assembly," respectively.

However, when there is an abnormal switch, a plurality of battery modules may be unable to be set to the series state and/or the parallel state. Even when the plurality of battery modules cannot be set to the series state and/or the parallel state, the plurality of battery modules may be able to be set to a single-connected state. In the battery system, the electronic control unit can set the plurality of battery modules to the single-connected state by controlling the normal switches using the abnormality pattern (a switching pattern in which a plurality of battery modules are in the single-connected state) in this case. For example, when the battery system is mounted in a vehicle, the vehicle may be made to travel in a limp-home mode by setting the plurality of battery modules to the single-connected state. The limp-home mode or sometimes being referred to as "limp mode" is, for example, a mode of continuing traveling with a minimum necessary function of the vehicle being maintained when the function of the vehicle is degraded. In the following description, a power storage assembly including only one battery module forming a closed circuit when the plurality of battery modules are in the single-connected state may be referred to as a "single-module power storage assembly."

In the above aspect, the storage device may store the following switching patterns as the abnormality pattern for a situation in which the predetermined switch is in a predetermined state being any one of an open state and a closed state and the predetermined switch is unable to be controlled: i) a first switching pattern in which the plurality of the battery modules are in the single-corrected state; and ii) a second switching pattern in which the plurality of the battery modules are in the series state or the parallel state; and the control device may be configured to, when the predetermined switch becomes unable to be controlled in the predetermined state, control switching of the switches other than the predetermined switch using any one of the first switching pattern and the second switching pattern.

In the battery system, the first switching pattern and, the second switching pattern indicate ON-OFF states of other switches when the predetermined switch in the predetermined state becomes unable to be controlled. The first switching pattern indicates an ON-OFF state in which the plurality of battery modules becomes the single-connected state. The second switching pattern indicates an ON-OFF state in which the plurality of battery modules becomes the series state or the parallel state. That is, when the first switching pattern is selected and when the second switching pattern is selected, the plurality of battery modules is in different states. In the battery system, normal switches can be set to a preferable state depending on the situation, that is, the plurality of battery modules can be set to a preferable state depending on the situation, by selecting the first switching pattern in a situation in which it is preferable to use the first switching pattern and selecting the second switching pattern in a situation in which it is preferable to use the second switching pattern.

The electronic control unit ran select and use the first switching pattern or the second switching pattern, for example, in accordance with a predetermined rule. The electronic control unit may select and use the first switching pattern or the second switching pattern in accordance with an instruction from a user.

For example, an inter-terminal voltage of a series power storage assembly is higher than an inter-terminal voltage of a single-module power storage assembly. Accordingly, when the second switching pattern is determined such that the plurality of battery modules is in the series state, the first switching pattern may be selected in a situation in which it is intended to decrease the voltage of the power storage assembly, and the second switching pattern may be selected in a situation in which it is intended to increase the voltage of the power storage assembly. More specifically, when the battery system is mounted in a vehicle which is configured to charge the battery modules with electric power from an external power supply outside the vehicle and the voltage of the power storage assembly does not correspond to the external power supply, the power storage assembly (eventually the battery modules) cannot be charged. Therefore, the first switching pattern or the second switching pattern may be selected depending on specifications (for example, a maximum voltage) of the external power supply such that the rated voltage of the power storage assembly is set to a voltage corresponding to the external power supply. Accordingly, it is possible to increase available charging facilities in a situation in which there is an abnormal switch. In the following description, charging of a battery module with electric power of an external power supply outside the vehicle may be referred to as "external charging."

In the above aspect, the storage device may store a plurality of the abnormality patterns and stores guidance information for guiding a user to a predetermined charging facility correlated with each of the plurality of the abnormality pattern; and the control device may be configured to, when any one of the plurality of switches is unable to be controlled, control switches other than the one of the plurality of the switches which is unable to be controlled using one abnormality pattern selected from the plurality of the abnormality patterns stored in the storage device and guide the user to the predetermined charging facility using the guidance information.

In the following description, guiding a user to a charging facility may be referred to as "user guidance." When there is an abnormal switch, a charging facility, which was usable in a situation in which there was no abnormal switch, may become unavailable. When a user does not know of an available charging facility at the time of external charging, the user may realize that a charging facility is not available after the user has moved to an installation place of the charging facility. On the other hand, in the battery system, information (guidance information) for guiding a user to a predetermined charging facility correlated with each abnormality pattern is stored in the storage device. In the guidance information, an available charging facility can be correlated with each abnormality pattern. By using such guidance information, it is possible to guide a user to an available charging facility by performing user guidance when an abnormality pattern is used. That is, even in a situation in which there is an abnormal switch, a user can find an available charging facility through, the user guidance.

The electronic control unit may select one or more abnormality patterns from a plurality of abnormality patterns based on a predetermined rule or an instruction from a user or the like as the result of switch abnormality determination. The storage device may include a plurality of units. When the storage device includes a plurality of units, the abnormality pattern and the guidance information may be stored in the same unit or may be stored in different units.

In the above aspect, the plurality of battery modules may include a first battery module and a second battery module; the plurality of switches may include a first relay that is disposed on a first electric wire connecting a positive electrode of the first battery module and a positive electrode of the second battery module, a second relay that is disposed on a second electric wire connecting the positive electrode of the first battery module and a negative electrode of the second battery module, and a third relay that is disposed on a third electric wire connecting a negative electrode of the first battery module and the negative electrode of the second battery module; a first node to which the first electric wire and the second electric wire are connected may be located closer to the positive electrode of the first battery module than the first relay; and a second node to which the second electric wire and the third electric wire are connected may be located closer to the negative electrode of the second battery module than the third relay.

With the plurality of battery modules and the plurality of switches, it is possible to switch between a series power storage assembly and a parallel power storage assembly with a simple configuration.

According to the disclosure, it is possible to provide a battery system that can make a plurality of battery modules usable using other switches when switching control of a switch which is used to switch a connection mode of the plurality of battery modules is not possible.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a diagram illustrating a first example of a stuck-state pattern;

FIG. 10 is a diagram illustrating a second example of a stuck-state pattern; and FIG. 11 is a flowchart illustrating a modified example of the routine illustrated in FIG. 8.

DETAILED DESCRIPTION

Figure 1:
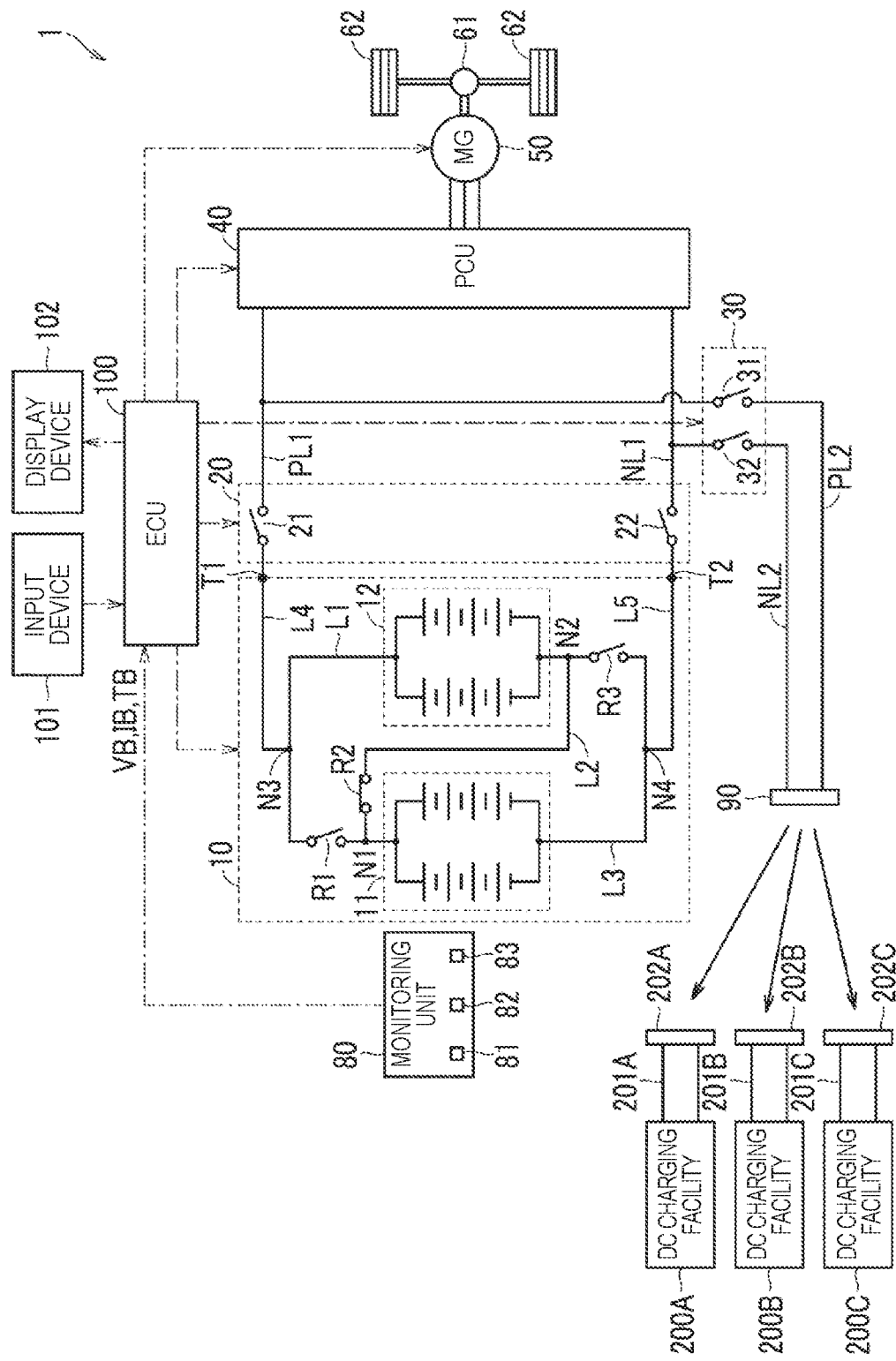
FIG. 1 is a diagram illustrating a configuration of a vehicle to which a battery system according to an embodiment of the disclosure is applied.

Hereinafter, an embodiment of the disclosure will be described in detail with reference to the accompanying drawings. The same or corresponding elements in the drawings will be referred to by the same reference signs and description thereof will not be repeated.

In the following description, it is assumed that a battery system according to, this embodiment is applied to an electric, vehicle. However, an application object of the battery system is not limited to an electric vehicle, but may be a hybrid vehicle. The application of the battery system is not limited to a vehicle, but may be stationary.

FIG. 1 is a diagram illustrating a configuration of a vehicle 1 (particularly, a circuit including battery modules 11 and 12) to which the battery system according to this embodiment is applied.

The vehicle 1 includes a power storage device 10, a main relay device 20, a charging relay device 30, a power control unit hereinafter referred to as "PCU") 40, a motor generator (hereinafter referred to as "MG") 50, a power transmission gear 61, driving wheels 62, a monitoring unit 80, an inlet 90, an electronic control unit (hereinafter abbreviated to "ECU") 100, an input device 101, and a display device 102.

The vehicle 1 is configured to charge the power storage device 10 with electric power of an external power supply (for example, power supplies included in DC charging facilities 200A to 200C which will be described later) outside the vehicle. The vehicle 1 is an externally chargeable vehicle in which the power storage device 10 is mounted in an externally chargeable manner. Electric power which is generated by the MG 50 in addition to electric power which is supplied from the inlet 90 by external charging can be accumulated in the power storage device 10.

The power storage device 10 includes two battery modules 11 and 12 and three relays R1, R2, and R3 (hereinafter also referred to as "switching relays"). Each of the battery modules 11 and 12 includes a plurality of secondary batteries. Each secondary battery constituting the battery modules 11 and 12 may be referred to as a "cell." A plurality of cells which are connected in series may be referred to as a "cell array." The relays R1, R2, and R3 according to this embodiment correspond to an example of "switches" in the present disclosure.

A cell is a DC power source which is rechargeable. For example, a lithium ion battery can be employed as the cell. Here, a secondary battery other than a lithium ion battery (for example, a nickel hydride battery or an all-solid battery) may be employed as the cell.

In this embodiment, each of the battery modules 11 and 12 includes a plurality of cell arrays (for example, two cell arrays) which are connected in parallel. For example, a battery stack can be employed as the cell array. The configuration of the battery modules 11 and 12 can be at arbitrarily changed. For example, each of the battery modules 11 and 12 may include one cell array. Alternatively, each of the battery modules 11 and 12 may include one secondary battery.

The relays R1, R2, and R3 are arranged in a circuit including the battery modules 11 and 12 to be switchable among a series state, a parallel state, a first single-connected state, and a second singles-connected state which will be described later. The battery modules 11 and 12 can be in a first short-circuited state and a second short-circuited state which will be described later depending on the ON-OFF states of the relays R1, R2, and R3. In the following description, a state in which a relay is in a closed state may be referred to as "ON" and a state in which a relay is in an open state may be referred to as "OFF."

The series state is a state in which the battery modules 11 and 12 are connected in series. When the relays R1, R2, and R3 are in OFF, ON, and OFF states, respectively, the battery modules 11 and 12 are in the series state.

The parallel state is a state in which the battery modules 11 and 12 are connected in parallel. When the relays R1, R2, and R3 are in ON, OFF, and ON states, respectively, the battery modules 11 and 12 are in the parallel state.

The first single-connected state is a state in which only the battery module 11 out of the battery modules 11 and 12 forms a closed circuit. When the relays R1, R2, and R3 are in ON, OFF, and OFF states, respectively, the battery modules 11 and 12 are in the first single-connected state.

The second single-connected state is a state in which only the battery module 12 out of the battery modules 11 and 12 forms a closed circuit. When the relays R1, R2, and R3 are in OFF, OFF, and ON states, respectively, the battery modules 11 and 12 are in the second single-connected state.

The first short-circuited state is a state in which terminals of the battery module 11 are short-circuited. When the relays R2 and R3 are in ON and ON states, respectively, the battery module 11 is in the first short-circuited state.

The second short-circuited state is a state in which terminals of the battery module 12 are short-circuited. When the relays R1 and R2 are in ON and ON states, respectively, the battery module 12 is in the second short-circuited state.

Hereinafter, the power storage devices 10 in which the battery modules 11 and 12 are in the series state, the parallel state, the first single-connected state, and the second single-connected state may be referred to as "the power storage device 10 in the series state," "the power storage device 10 in the parallel state," "the power storage device 10 in the first single-connected state," and "the power storage device 10 in the second single-connected state," respectively.

An inter-terminal voltage of the power storage device 10 (a voltage between a positive terminal T1 and a negative terminal T2) changes depending on a connection state of the battery modules 11 and 12. Out of the power storage device 10 in the series state and the power storage device 10 in the parallel state, the inter-terminal voltage in the power storage device 10 in the parallel state is lower.

The relay R1 is disposed on an electric wire L1 which connects a positive electrode of the battery module 11 and a positive electrode of the battery module 12 to each other. The relay R2 is disposed on an electric wire L2 which connects the positive electrode of the battery module 11 and a negative electrode of the battery module 12 to each other. The relay R3 is disposed on an electric wire L3 which connects a negative electrode of the battery module 11 and the negative electrode of the battery module 12 to each other. The electric wire L1 and the electric wire L2 are connected to each other at a node N1. The electric wire L2 and the electric wire L3 are connected to each other at a node N2.

An electric wire L4 which is connected to a positive terminal T1 of the power storage device 10 is connected to the electric wire L1 at a node N3. The relay R1 is located between the node N3 and the positive electrode of the battery module 11. The node N1 is located closer to the positive electrode of the battery module 11 than the relay R1. There is no switch between the node N3 and the positive electrode of the battery module 12. An electric wire L5 which is connected to a negative terminal T2 of the power storage device 10 is connected to the electric wire L3 at a node N4. The relay R3 is located between the node N4 and the negative electrode of the battery module 12. The node N2 is located closer to the negative electrode of the battery module 12 than the relay R3. There is no switch between the node N4 and the negative electrode of the battery module 11.

For example, an electromagnetic mechanical relay can be employed as a switching relay (the relays R1, R2, and R3). Here, a semiconductor relay which is also referred to as a solid state relay (SSR) may be employed as a switching relay. Examples of the semiconductor relay include a thyristor, a triac, and a relay constituted by a transistor (an IGBT, a MOSFET, or a bipolar transistor).

In this embodiment, each of the relays R1 to R3 is defined as a normally open switch. That is, each of the relays R1 to R3 is turned off in a state in which no voltage is applied thereto and is turned on by applying a voltage thereto. Note that the disclosure is not limited thereto, and a normally closed switch may be employed as at least one of the relays R1 to R3.

The monitoring unit 80 is configured to monitor the state of the power storage device 10. The monitoring unit 80 includes a voltage sensor 81, a current sensor 82, and a temperature sensor 83. The voltage sensor 81 detects the inter-terminal voltage of the power storage device 10 (a battery voltage) and outputs the detected value VB to the ECU 100. The current sensor 82 detects a current flowing in the power storage device 10 (a battery current) and outputs the detected value IB to the ECU 100. The temperature sensor 83 detects a temperature of the power storage device 10 (a battery temperature) and outputs the detected value TB to the ECU 100. A charging current supplied from a DC charging facility to the power storage device 10 and a discharging current supplied from the power storage device 10 to a travel driving unit can be detected by the current sensor 82.

The voltage sensor 81 and the temperature sensor 83 may be provided for each cell, may be provided for a plurality of cells, or may be provided for each battery module. When the sensors are provided for each cell constituting a battery module, a representative value (such as an average value, a median value, or a maximum value) of data detected for a plurality of cells can be used as a detected value for the corresponding battery module. A representative value (such as an average value, a median value, or a maximum value) detected for each of the battery modules 11 and 12 can be used as a detected value for the power storage device 10.

The main relay device 20 is electrically connected to a current path which connects the power storage device 10 and the PCU 40. The main relay device 20 electrically sets up or cuts off the current path of the power storage device 10 based on a control signal from the ECU 100. When, the SMRs 21 and 22 are in an OFF state, neither of charging and discharging of the power storage device 10 can be performed.

The main relay device 20 includes system main relays (hereinafter abbreviated to "SMRs") 21 and 22. The SMR 21 is provided in a power line PL1 connected to the positive terminal T1 of the power storage device 10. The SMR 22 is provided in a power line NL1 connected to the negative terminal T2 of the power storage device 10. Each of the SMRs 21 and 22 is turned off/on (OFF/ON) in accordance with a control signal from the ECU 100. When the SMRs 21 and 22 are in the OFF state, the current path connecting the power storage device 10 and the PCU 40 is cut off. When the SMRs 21 and 22 are in the ON state, the current path is set up, and transmission of electric power between the power storage device 10 and the PCU 40 can be performed.

The PCU 40 and the MG 50 constitute a travel driving unit of the vehicle 1. The travel driving unit is configured to convert electric power (electrical energy) supplied from the power storage device 10 into power (mechanical energy) for driving the driving wheels 62.

The PCU 40 includes an inverter and a converter (neither of which is illustrated). Each of the inverter and the converter includes a plurality of switching elements (such as transistors) and is controlled in accordance with a control signal from the ECU 100.

At the time of discharging of the power storage device 10, the converter increases a voltage supplied from the power storage device 10 and supplies the increased voltage to the inverter. The inverter converts DC power supplied from the converter into AC power and drives the MG 50. At the time of charging of the power storage device 10, the inverter converts AC power generated by the MG 50 into DC power and supplies the DC power to the converter. The converter decreases a voltage supplied from the inverter and supplies the decreased voltage to the power storage device 10.

The MG 50 is, for example, a three-phase AC rotary electric machine. An output torque of the MG 50 is transmitted to the driving wheels 62 via the power transmission gear 61 which is constituted by a reduction gear or the like. The MG 50 can also generate electric power using a rotational force of the driving wheels 62 at the time of regenerative braking of the vehicle 1. FIG. 1 illustrates a configuration including only one MG, but the number of MGs is not limited thereto and a plurality of (for example, two) MGs may be provided.

The charging relay device 30 is provided on power lines PL2 and NL2 which branch from the power lines PL1 and NL1 connecting the power storage device 10 and the PCU 40 and are connected to the inlet 90. The charging relay device 30 electrically sets up or electrically cuts off a current path connecting the power storage device 10 and the inlet 90 based on a control signal from the ECU 100.

The charging relay device 30 includes charging relays (hereinafter abbreviated to "CHRs") 31 and 32. The CHR 31 is provided on the power line PL2 connected to the power line PL1. The CHR 32 is provided on the power line NL2 connected to the power line NL1. Each of the CHRs 31 and 32 is turned off/on (OFF/ON) in accordance with a control signal from the ECU 100. When the CHRs 31 and 32 are in the OFF state, the current path connecting the power storage device 10 and the inlet 90 is cut off. When the CHRs 31 and 32 are in the ON state, electric power can be supplied from the inlet 90 to the SMRs 21 and 22. When the SMRs 21 and 22 are in the ON state in addition to the CHRs 31 and 32, the current path is set up and electric power can be supplied from the inlet 90 to the power storage device 10.

A connector (for example, a connector 202A, 202B, or 202C which will be described later) of a charging cable of a DC charging facility is connected to the inlet 90. The DC charging facility includes a DC power supply (not illustrated), and can supply DC power from the DC charging facility to the inlet 90 via the charging cable by connecting the connector of the charging cable to the inlet 90. When the SMRs 21 and 22 and the CHRs 31 and 32 are in the ON state, DC power supplied from the DC charging facility to the inlet 90 is directly supplied to the power storage device 10 without passing through a power conversion device (such as a converter) and the power storage device 10 is charged with the DC power.

The ECU 100 includes a central processing unit (CPU) as an computing device, a storage device, and an input and output port for inputting and outputting various signals (none of which is illustrated). The storage device of the ECU 100 includes a random access memory (RAM) which is a work memory and an archival storage (such as a read only memory (ROM) or a rewritable nonvolatile memory). By causing the CPU to execute a program stored in the storage device, various controls are embodied. The various controls which are executed by the ECU 100 are not limited to control processes using software, and may be embodied in dedicated hardware (an electronic circuit).

In the ECU 100, the CPU outputs acquired information (such as an operation result) to the storage device (for example, a rewritable nonvolatile memory) and stores the information in the storage device. The storage device of the ECU 100 may store information (such as a normality pattern, a stuck-state pattern, and a threshold value which will be described later) which is used for traveling control of the vehicle 1 or charging control of the power storage device 10 in advance.

The input device 101 is a device that receives an instruction from a user. The input device 101 is operated by a user and outputs a signal corresponding to the user's operation to the ECU 100. A user can operate the input device 101 to transmit an instruction to the ECU 100. The communication between the ECU 100 and the input device 101 may be performed by a cable or wireless communication. The input device 101 is installed at a position at which it can be operated by a user who sits on a driver's seat (not illustrated) of the vehicle 1.

The input device 101 includes a screen operating unit to which an operation corresponding to a screen displayed on a display of the display device 102, which will be described later, is input and a switch (hereinafter referred to as a "power switch") which is operated when driving of the vehicle 1 is started. In this embodiment, a touch panel is employed as the screen operating unit (not illustrated) and a push button switch is employed as the power switch (not illustrated). The disclosure is not limited thereto and a keyboard, a mouse, and the like, can also be employed as the screen operating unit. A key switch, a slide switch, a lever, or the like can also be employed as the power switch. The screen operating unit may be an operation unit of an onboard ear navigation system or may be an operation unit of a mobile device. Various mobile devices having a microcomputer built therein such as a smartphone, a smart watch, a notebook PC, a tablet terminal, and a portable game machine can be used as the mobile device.

The display device 102 is a device that displays information or a signal input from the ECU 100. The communication system between the ECU 100 and the display device 102 may be wired or wireless. The display device 102 is installed at a position which can be seen by a user who sits on a driver seat (not illustrated) of the vehicle 1.

The display device 102 includes a display that displays a variety of information, a lamp (hereinafter referred to as a "READY lamp") notifying a user whether electric power is supplied to the travel driving unit (the PCU 40 or the like) of the vehicle 1 by turning on/off, and a lamp (hereinafter referred to as a "charging lamp") notifying a user whether the vehicle 1 is being externally charged by turning on/off. The display may be display unit of a meter panel, may be a display unit of an onboard car navigation system, or may be a display unit of a mobile device (for example, various mobile device having a microcomputer built therein). The display may have a speaker function.

With recent spread of an electric vehicle (an EV car) or a plug-in hybrid vehicle (a PHV car), preparation of infrastructure for charging a power storage device mounted in such a vehicle (hereinafter referred to as "charging infrastructure") has been promoted. A power supply stand is installed as charging infrastructure in public facilities, commercial facilities, lodging facilities, parking lots (for example, a service area in an expressway), and the like. As general power supply stands, a standard charger and a quick charger are known.

A standard charger is an AC charging facility which can be installed at a low cost and is also installed in a house or the like. A typical standard charger includes a single-phase AC power source with a voltage of 200 V or 100 V and is configured to supply AC power with an output of about 3 kW (a voltage of 200V and a maximum current of 15 A). The vehicle 1 may include a charger (not illustrated) which is used to perform external charging using a standard charger. That is, the power storage device 10 may be charged by converting AC power supplied from a standard charger into DC power with a voltage of about 500 V using a charger (not illustrated) mounted in the vehicle 1 and supplying the DC power to the power storage device 10.

The quick charger is a DC charging facility in which a time required for charging a power storage device is short. A typical quick charger includes a three-phase AC power source with a voltage of 200 V and is configured to convert AC power supplied from the power source into DC Power and to supply the DC power with a maximum output of 50 kW (a maximum voltage of 500 V and a maximum current of 125 A).

Recently, an increase in power of a DC charging facility has progressed to further shorten the time required for charging a power storage device. An ultra-quick charger with a larger maximum output (for example, a maximum output larger than 100 kW) than that of a quick charger has been introduced.

FIG. 1 illustrates three types of DC charging facilities 200A to 200C. The DC charging facilities 200A, 200B, and 200C include charging cables 201A, 201B, and 201C, respectively. Connectors 202A, 202B, and 202C are attached to the ends of the charging cables 201A, 201B, and 201C. Each charging cable includes a power line and a communication line. When a power line can also be used as a communication line, it is not necessary to provide a communication line in a charging cable.

The DC charging facility 200A is a first example of an ultra-quick charger. The DC charging facility 200A is configured to supply DC power with a maximum output of 160 kW (a maximum voltage of 400 V and a maximum current of 400 A).

The DC charging facility 200B is a second example of an ultra-quick charger. The DC charging facility 200B is configured to supply DC power with a maximum output of 160 kW (a maximum voltage 800 V and a maximum current of 200 A).

The DC charging facility 200C is a third example of an ultra-quick charger. The DC charging facility 200C can supply both DC power with a high voltage (a maximum output of 160 kW: a maximum voltage 800 V and a maximum current of 200 A) and DC power with a low voltage (a maximum output of 160 kW: a maximum voltage 400 V and a maximum current of 400 A). The DC charging facility 200C is configured to supply one of the DC power with a high voltage and the DC power with a low voltage in response to a request from a user.

By increasing electric power output from a DC charging facility, it is possible to increase a charging speed. However, when high electric power with a low voltage is output from a DC charging facility, a current flowing in a charging cable (for example, the charging cable 201A, 201B, or 201C) increases. By supplying electric power from the inlet 90 connected to such a charging cable to a circuit of the vehicle 1 (an onboard circuit), a large current also flows in the onboard circuit. When the current flowing in the charging cable or the onboard circuit increases, the loss due to emission of heat is likely to increase and charging efficiency is likely to decrease. In some cases, a DC charging facility which is installed as charging infrastructure can supply high power but does not have heat resistance with which the charging cable or the connector thereof can have resistance to emission of heat due to a large current.

In order to decrease a current flowing in the charging cable or the onboard circuit, employing of a power storage device with a high voltage may also be considered. However, when a power storage device with a high voltage is used as a power storage device that supplies electric power to the travel driving unit of the vehicle 1, power efficiency (a rate of electric power consumption) daring traveling of the vehicle 1 is likely to decrease. For example, when a switching element of the PCU 40 is turned on and off in a state in which a high voltage is applied thereto, noise (ripple) is likely to be generated and power loss is likely to increase.

Therefore, in the battery system according to this embodiment, a plurality of switching relays (the relays R1, R2, and R3) are arranged to be switchable between a series state and a parallel state in a circuit including the battery modules 11 and 12, and the ECU 100 (an electronic control unit) controls switching of the switching relays. By causing the ECU 100 to perform switching control of the switching relays, the connection mode of the battery modules 11 and 12 can be changed depending on the state of the vehicle 1. Switching control of the switching relays by the ECU 100 will be described below in detail.

Figures 2, 3:
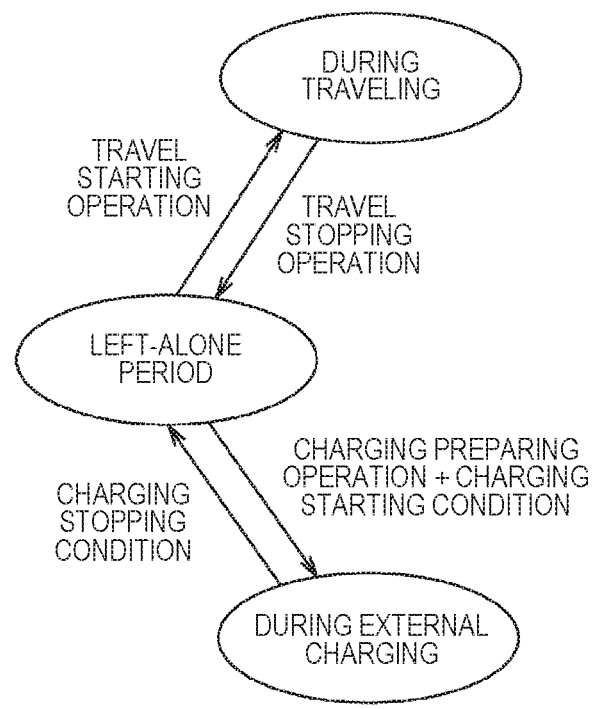
FIG. 2 is a diagram illustrating change of a state of the vehicle illustrated in FIG. 1.
FIG. 3 is a diagram illustrating ON/OFF states of an SMR and a switching relay of a brand new vehicle when the vehicle is traveling, when the vehicle is in a left-alone period, and when the vehicle is charged by external charging.

FIG. 2 is a diagram illustrating change of a state of the vehicle 1. Referring to FIG. 2, the state of the vehicle 1 can be roughly divided into "during traveling," "left-alone period," and "during external charging." When the vehicle 1 is "during traveling," it means that the vehicle 1 is in a state in which electric power is supplied to the travel driving unit of the vehicle 1 (hereinafter also referred to as a "READY-ON state") and external charging is not performed on the vehicle. When the vehicle 1 is in a "left-alone period," it means that the vehicle 1 is in a state in which electric power is not supplied to the travel driving unit of the vehicle 1 (hereinafter also referred to as a "READY-OFF state") and external charging is not performed on the vehicle 1. When the vehicle 1 is "during external charging," it means that external charging is being performed on the vehicle 1.

When a predetermined travel starting operation is performed on the vehicle 1 in the left-alone period, the SMRs 21 and 22 are turned on by the ECU 100 and the state of the vehicle 1 is during traveling. When the vehicle 1 is in, the READY-ON state, the READY lamp of the display device 102 is turned on. When the state of the vehicle 1 becomes during traveling, the vehicle 1 can be made to travel, by the travel driving unit. A user (a driver of the vehicle 1) can adjust an amount of driving power of the travel driving unit by operating an accelerator pedal (not illustrated) or the like of the vehicle 1. In this embodiment, an operation of pressing a power switch of the input device 101 in a state in which a brake pedal (not illustrated) of the vehicle 1 is depressed is defined as the travel starting operation. In a hybrid vehicle, an operation of turning on an ignition switch may be defined as the travel starting operation.

When a predetermined travel stopping operation is performed on the vehicle 1 during traveling, the SMRs 21 and 22 are turned off by the ECU 100 and the state of the vehicle 1 is in the left-alone period. When the vehicle 1 is in the READY of state, the READY lamp of the display device 102 is turned off. For example, when a user parks the vehicle 1 (stops driving), the vehicle 1 is set to a non-drivable state (that is, left-alone period). In this embodiment, an operation of long pressing the power switch of the input device 101 (continuously pressing the power switch for a predetermined time) in a state in which the brake pedal (not illustrated) of the vehicle 1 is depressed is defined as the travel stopping operation. In a hybrid vehicle, an operation of turning off an ignition switch may be defined as the travel stopping operation.

When a predetermined charging preparing operation is performed on the vehicle 1 in the left-alone period and a predetermined charging start condition has been satisfied, the SMRs 21 and 22 and the CHRs 31 and 32 are turned on by the ECU 100 and the state of the vehicle 1 is during external charging. When the state of the vehicle 1 is during external charging, the charging lamp of the display device 102 is turned on. In this embodiment, an operation of connecting a connector of a charging cable of a DC charging facility to the inlet 90 of the vehicle 1 is defined as the charging preparing operation. The charging start condition will be described later.

When a predetermined charging stop condition is satisfied in the vehicle 1 during external charging, the SMRs 21 and 22 and the CHRs 31 and 32 are turned off by the ECU 100 and the state of the vehicle 1 is in the left-alone period. When the state of the vehicle 1 departs from during external charging, the charging lamp of the display device 102 is turned off. The charging stop condition will be described later.

Switching control of the SMRs and the switching relays in the brand new vehicle 1 (that is, the vehicle 1 in which deterioration of a battery module which will be described later has not occurred) will be described below with reference to FIGS. 3 to 6.

FIG. 3 is a diagram illustrating ON-OFF states of the SMRs and the switching relays when the brand new vehicle 1 is during traveling, in the left-alone period, and during external charging.

Figure 4:
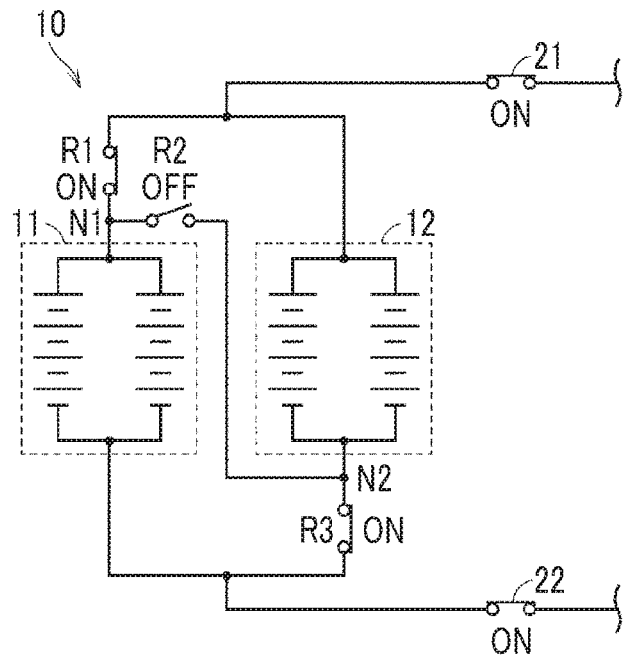
FIG. 4 is a diagram illustrating an SMR and a switching relay when the vehicle illustrated in FIG. 1 is traveling.

Referring to FIG. 3, when the vehicle 1 is during traveling, the SMRs 21 and 22 are turned to the ON state and the relays R1, R2, and R3 are turned to the ON state, the OFF state, and the ON state, respectively, by the ECU 100. FIG. 4 is a diagram illustrating the SMRs and the switching relays in such ON-OFF states. As illustrated in FIG. 4, when the vehicle 1 is during traveling, the battery modules 11 and 12 are in the parallel state.

Figure 5:
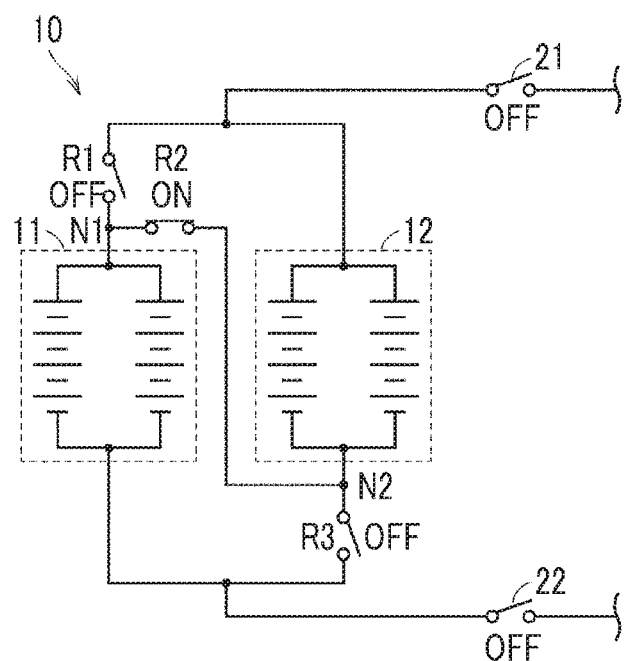
FIG. 5 is a diagram illustrating an SMR and a switching relay when the vehicle illustrated in FIG. 1 is left alone.

Referring back to FIG. 3, when the vehicle 1 is in the left-alone period, the SMRs 21 and 22 are turned to the OFF state and the relays R1, R2, and R3 are turned to the OFF state, the ON state, and the OFF state, respectively, by the ECU 100. FIG. 5 is a diagram illustrating the SMRs and the switching relays in such ON-OFF states. As illustrated in FIG. 5, when the vehicle 1 is in the left-alone period, the battery modules 11 and 12 are in the series state.

Figures 6, 7:
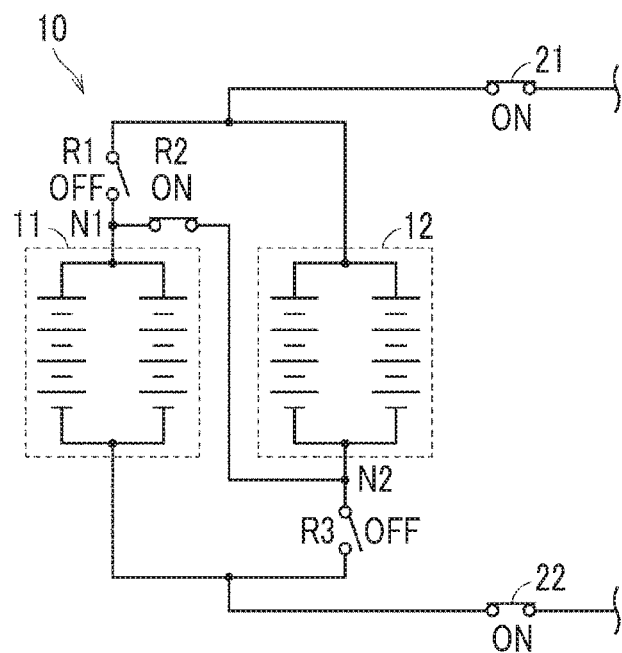
FIG. 6 is a diagram illustrating an SMR and a switching relay when the vehicle illustrated in FIG. 1 is charged in by external charging.
FIG. 7 is a diagram illustrating switching control of a switching relay in a situation in which there is a stuck relay.

Referring back to FIG. 3, when the vehicle 1 is during external charging, the SMRs 21 and 22 are turned to the ON state and the relays R1, R2, and R3 are turned to the OFF state, the ON state, and the OFF state, respectively, by the ECU 100. FIG. 6 is a diagram illustrating the SMRs and the switching relays in such ON-OFF states. As illustrated in FIG. 6, when the vehicle 1 is during external charging, the battery modules 11 and 12 are in the series state.

When the vehicle 1 is during external charging, the inter-terminal voltage of the power storage device 10 can be increased by switching the battery modules 11 and 12 to the series state using the switching relays. The power storage device 10 in the series state can be charged by a DC charging facility that supplies electric power with a high voltage. Accordingly, it is possible to decrease a current flowing in the charging cable or the onboard circuit during external charging. By decreasing a current for supply of power, it is possible to improve charging efficiency.

On the other hand, when the vehicle 1 is during traveling, the inter-terminal voltage of the power storage device 10 can be decreased by switching the battery modules 11 and 12 to the parallel state using the switching relays. By supplying electric power with a low voltage from the power storage device 10 in the parallel state to the travel driving unit of the vehicle 1, it is possible to increase power efficiency (electric power economy) in traveling of the vehicle 1.

In this embodiment, it is assumed in the brand new vehicle 1 that the rated voltage (an SOC of 0% to 100%) of the power storage device 10 in the series state range from 600 V to 800 V and the rated voltage (an SOC of 0% to 100%) of the power storage device 10 in the parallel state range from 300 V to 400 V. The SOC is defined as a ratio (for example, percentage) of a current charging capacity to a full-charging capacity.

There is a possibility that switching control of a switch which is used in the battery system is unable to be executed. For example, when deterioration of a switching relay progresses and the switching relay is stuck closed or stuck open, the ECU 100 cannot control switching of the switching relay. Operations and advantages of the battery system according to this embodiment when switching control of a switching relay is not possible due to being stuck will be described below, the same is true when switching control of a switching relay is not possible due to another reason (such as open circuit).

When any one of a plurality of switching relays used in the battery system is stuck, there is concern that at least one of the battery modules 11 and 12 may be short-circuited depending on ON-OFF states of the stuck switching relay (hereinafter referred to as a "stuck relay") and switching relays (hereinafter referred to as "normal relays") other than the stuck relay. For example, when the relays R2 and R3 are in the ON state, the battery module 11 is in the first short-circuited state. When the relays R1 and R2 are in the ON state, the battery module 12 is in the second short-circuited state. Accordingly, if information indicating how normal relays are controlled when a certain switching relay is stuck is not prepared, it is difficult to continuously use the battery system.

Therefore, a switching pattern (hereinafter referred to as a "stuck-state pattern") is stored in the storage device of the ECU 100 in the battery system according to this embodiment. The stuck-state pattern indicates to which of the open state and the closed state other relays (normal relays) are switched when a predetermined relay of the relays R1 to R3 are stuck closed or stuck open. The stuck-state pattern is determined such that the battery modules 11 and 12 are not in the short-circuited state. When a predetermined relay of the relays R1 to R3 is stuck closed or stuck open, the ECU 100 controls switching of the normal relays such that the battery modules 11 and 12 are not in the short-circuited state using the stuck-state pattern. The stuck-state pattern according to this embodiment corresponds to an example of an "abnormality pattern" in the disclosure.

A switching pattern (hereinafter referred to as a "normality pattern") indicating to which of the open state and the closed state each of the relays R1 to R3 is switched when there is no stuck relay is illustrated in FIG. 3. The normality pattern is stored in the storage device of the ECU 100. The ECU 100 is configured to control switching of the relays R1 to R3 using the normality pattern when there is no stuck relay.

On the other hand, when there is a stuck relay, the ECU 100 performs switching control of the switching relays in a manner other than described above. FIG. 7 is a diagram illustrating switching control of the switching relays in a situation in which there is a stuck relay. As illustrated in FIG. 7, the ECU 100 is configured to control switching of the normal relays using the stuck-state pattern when there is a stuck relay. Accordingly, even when there is a stuck relay, it is possible to make the battery modules 11 and 12 usable using the normal relays. An example of the stuck-state pattern will be described later (see FIGS. 9 and 10).

Figure 8:
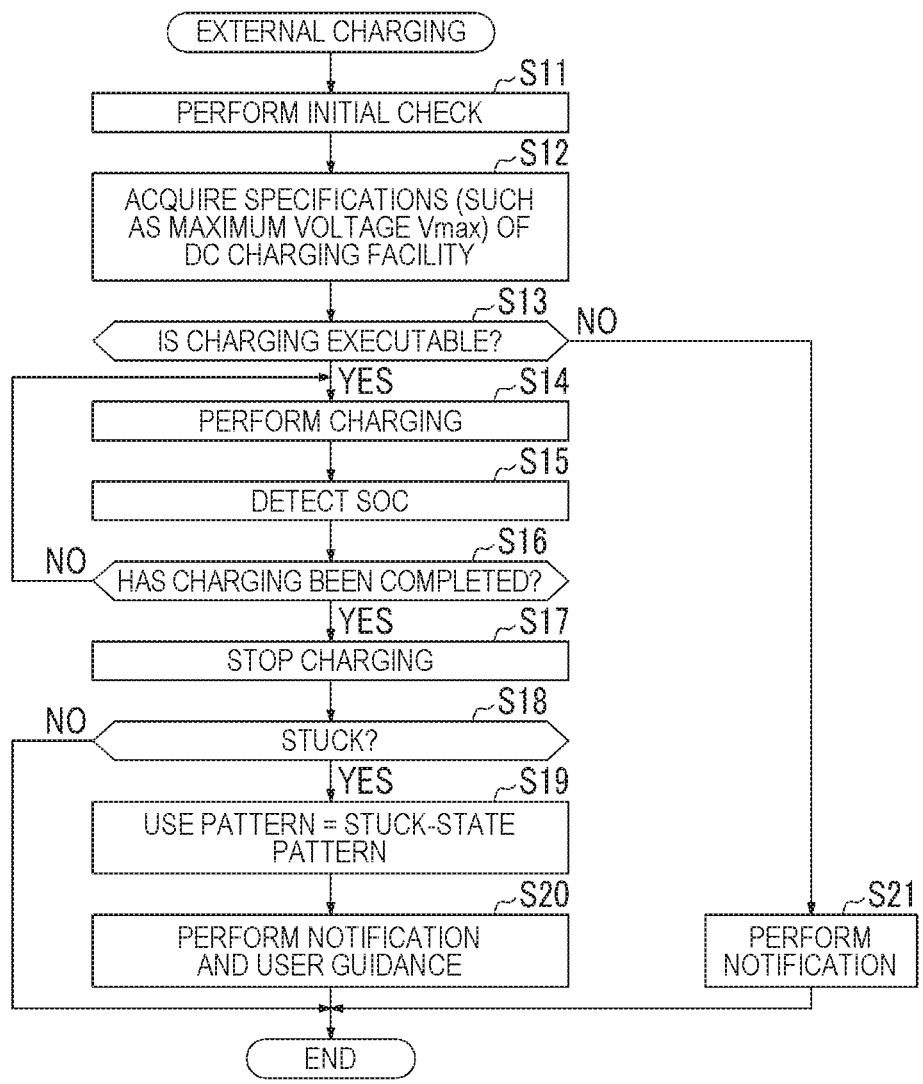
FIG. 8 is a flowchart illustrating a routine of charging control which is performed by a controller of the battery system according to an embodiment of the disclosure.

Charging control by the ECU 100 when the power storage device 10 is charged using the DC charging facility 200C will be described below in detail with reference to FIG. 8. FIG. 8 is a flowchart illustrating a routine of charging control which is performed by the ECU 100. When the vehicle 1 is in the left-alone period, the routine illustrated in FIG. 8 is selected and performed in the main routine (main program) by performing the above-mentioned charging preparing operation and performing a predetermined operation (for example, an operation of pressing a button of "charging execution" displayed on a touch panel of the DC charging facility) on the DC charging facility 200C. When the vehicle 1 is in the left-alone period, the battery modules 11 and 12 are in the series state (see FIG. 5). Even when the charging preparing operation has been performed, the battery modules 11 and 12 are kept in the series state. In the battery system in which the battery modules 11 and 12 are in the parallel state when the vehicle 1 is in the left-alone state, when the charging preparing operation has been performed, the ON-OFF states of the relays R1 to R3 may be changed by the ECU 100 such that the battery modules 11 and 12 are in the series state.

When the charging preparing operation is performed, the inlet 90 of the vehicle 1 and the connector 202C of the charging cable 201C of the DC charging facility 200C are connected. Accordingly, the vehicle 1 and the DC charging facility 2000 are communicatively connected to each other. The communication can be performed in any kind of way, such as a controller area network (CAN) or power line communication (PLC).

In this embodiment, a condition in which the predetermined operation on the DC charging facility 200C is performed and a condition in which it is determined in step S13, which will be described later, that external charging can be executed correspond to the charging start condition.

Referring to FIG. 8, first, the ECU 100 performs initial check (Step S11). The initial check is to check whether a charging path between the DC charging facility 200C and the power storage device 10 is normal. The initial check includes, for example, self-checking whether there is an electrical malfunction in the vehicle 1 and contact check between the inlet 90 and the connector 202C.

Then, the ECU 100 acquires specifications of the DC charging facility 200C (Step S12). In this embodiment, the maximum voltage Vmax (a suppliable maximum charging voltage) of the DC charging facility 200C is acquired as the specifications of the DC charging facility 200C. The maximum voltage Vmax of the DC charging facility 200C is 800 V.

The ECU 100 determines whether execution of external charging is possible based on the check result in Step S11 and the specifications of the DC charging facility 200C acquired in Step S12 (Step S13).

When it is determined in Step S13 that external charging cannot be executed (NO in Step S13), the ECU 100 controls the display device 102 such that a user is notified of a message indicating that external charging cannot be executed (Step S21).

For example, when an abnormality is found in the charging path in Step S11, the ECU 100 determines that external charging cannot be executed in Step S13. When the specifications of the DC charging facility 200C do not correspond to charging of the power storage device 10 (for example, when the maximum voltage Vmax of the DC charging facility 200C is excessively higher or excessively lower than the rated voltage of the power storage device 10 in the series state), the ECU 100 determines that external charging cannot be executed in Step S13. The maximum voltage Vmax of the DC charging facility 200C corresponds to charging of the power storage device 10 in the series state. When the vehicle 1 is connected to the DC charging facility 200A, not to the DC charging facility 200C, the maximum voltage Vmax of the DC charging facility is excessively low and thus it is determined that the specifications of the DC charging facility does not correspond to charging of the power storage device 10 in Step S13. The ECU 100 may notify a user of the message indicating that external charging cannot be executed together with the reason thereof in Step S21.

A notification method to a user may be any kind of method, such as notifying by display (of characters, an image, or the like), or notifying by sound (including speech), or notifying by turning on a predetermined lamp (which includes flickering the predetermined lamp). After the notification process has been performed in Step S21, the routine is returned to the main routine.

When it is determined in Step S13 that execution of external charging is possible (YES in Step S13), the state of the vehicle 1 is set to "during external charging" in Step S14 and external charging of the power storage device 10 is executed. The DC charging facility 200C receives the rated voltage of the power storage device 10 from the vehicle 1 and selects DC power with a high voltage suitable for charging of the power storage device 10 in the series state as supply power from DC power with a low voltage and DC power with a high voltage. The SMRs 21 and 22 and the CHRs 31 and 32 are turned on by the ECU 100 and charging of the power storage device 10 is performed with the DC power with a high voltage (with a maximum voltage of 800 V and a maximum current 200 A) supplied from the DC charging facility 200C. When the vehicle 1 is during external charging, the battery modules 11 and 12 are in the series state (see FIG. 6).

In this embodiment, when it is determined in Step S11 that the charging path is normal and the specifications of the DC charging facility 200C correspond to charging of the power storage device 10, the ECU 100 determines that execution of external charging is possible in Step S13.

The ECU 100 continues to execute external charging using the DC charging facility 200C until it is determined in Step S16 that charging has been completed (Steps S14 to S16). That is, while it is determined in Step S16 that charging has not been completed (NO in Step S16), external charging is executed.

The ECU 100 detects the SOC of the power storage device 10 during external charging (Step S15). As a method of measuring the SOC, for example, various kinds of method such as a method based on integration of a current value (a coulomb count) or a method based on estimation of an open-circuit voltage (OCV) can be employed.

In Step S16, the ECU 100 determines whether charging has been completed based on whether a predetermined charging stop condition has been satisfied. That is, the ECU 100 determines that charging has been completed when the charging stop condition has been satisfied. The charging stop condition is satisfied, for example, when the SOC of the power storage device 10 becomes greater than a predetermined threshold value during external charging. The threshold value may be automatically set by the ECU 100 or the like or may be set by a user. In this embodiment, the charging stop condition is satisfied when the SOC of the power storage device 10 is 100% (fully charged).

The charging stop condition can be set to be various kinds of condition. For example, the charging stop condition may be set to be satisfied when an execution time of external charging (an elapsed time after external charging has been first started in Step S14) is longer than a predetermined threshold value. The charging stop condition may be set to be satisfied when an instruction to stop charging has been given via the input device 101 by a user during external charging.

When it is determined in Step S16 that charging has been completed (YES in Step S16), the state of the vehicle 1 is the left-alone period. That is, the ECU 100 stops external charging by turning off the SMRs 21 and 22 and the CHRs 31 and 32 (Step S17).

Subsequently, the ECU 100 determines whether there is a stuck relay (one of being stuck open and being stuck closed) among the relays R1 to R3 (Step S18). Accordingly, it is detected which of the relays R1 to R3 has been stuck (that is, whether there is a stuck relay). When there is a stuck relay, it is detected which of the open state and the closed state (that is, which of being stuck open and being stuck closed) the state of the stuck relay is.

For example, the ECU 100 gives an instruction to perform a switching operation to each relay and determines whether the relay operates as instructed based on a voltage change and/or a current change of the power storage device 10 before and after the instruction has been given. When the detected value VB from the voltage sensor 81 or the detected value IB from the current sensor 82 does not change, it can be determined that the relay has not performed a switching operation. A relay which has not performed a switching operation in response to the instruction is determined to be stuck.

The ECU 100 gives an instruction of switching from the open state to the closed state to a relay in the open state and determines that the relay is stuck open when the relay has not been switched to the closed state. The ECU 100 gives an instruction of switching from the closed state to the open state to a relay in the closed state and determines that the relay is stuck closed when the relay has not been switched to the open state.

When none of the relays R1 to R3 is stuck (NO in Step S18), change of a use pattern which will be described below is not performed and the routine is returned to the main routine.

On the other hand, when any one of the relays R1 to R3 is stuck (YES in Step S18), a stuck-state pattern corresponding to the stuck relay is set instead of the normality pattern (see FIG. 3) as a switching pattern (hereinafter referred to as a "use pattern") which is used to control the relays R1 to R3 (Step S19). Accordingly, the ECU 100 controls switching of the normal relays using the stuck-state pattern.

FIG. 9 is a diagram illustrating a first example of a stuck-state pattern. In this embodiment, the stuck-state pattern illustrated in FIG. 9 is stored in the storage device of the ECU 100.

Referring to FIG. 9, the storage device of the ECU 100 stores three types of stuck-state patterns indicating to which of the open state and the closed state other relays (normal relays) are switched when each switching relay (the relays R1, R2, and R3) has been stuck closed and three types of stuck-state patterns indicating to which of the open state and the closed state other relays (normal relays) are switched when each switching relay (the relays R1, R2, and R3) has been stuck open. In Step S19, the ECU 100 selects one stuck-state pattern from six types of stuck-state patterns illustrated in FIG. 9 and sets the selected stuck-state pattern as a use pattern. The ECU 100 selects the stuck-state pattern based on the detection result in Step S18 (the detection result indicating which switching relay has been stuck in which state). In one of the left-alone period, during external charging, and during traveling of the vehicle 1, normal relays are in the ON-OFF states indicated in the selected stuck-state pattern. For example, when the relay R1 is stuck closed, the stuck-state pattern in which the relays R2 and R3 are turned off and on, respectively, is selected. When the relays R2 and R3 (the normal relays) are controlled using the stuck-state pattern, the power storage device 10 is in the parallel state. When the relay R3 is stuck open, the stuck-state pattern in which the relays R1 and R2, are turned off and on, respectively, is selected. When the relays R1 and R2 (the normal relays) are controlled using the stuck-state pattern, the power storage device 10 is in the series state.

Referring back to FIG. 8, the ECU 100 controls the display device 102 such that a notification process and user guidance which will be described below are performed (Step S20). Thereafter, the routine is returned to the main routine.

In the notification process, the display device 102 displays information (characters, an image, or the like) for notifying a user that a stuck in a relay has occurred. Note that the method of notifying a user may be any kind of method, such as using sound (which includes voice) or turning on (including flickering) a predetermined lamp. Through the notification process, a user may be prompted to replace the stuck relay (or the whole power storage device 10).

The ECU 100 may store which switching, relay is stuck in which state in the storage device by turning on a diagnostics (self-diagnosis) flag (a flag corresponding to the stuck relay) in the storage device by switching the value of the flag from 0 to 1.

Information for performing user guidance is stored in the storage device of the ECU 100 along with the above-mentioned stuck-state patterns. As illustrated in FIG. 9, a predetermined charging facility is correlated with each stuck state pattern. A stuck-state pattern with which the power storage device 10 is in the parallel state is correlated with a charging facility (for example, a DC charging facility that can charge a power storage device with a rated voltage of 300 V to 400 V) suitable for charging of the power storage device 10 in the parallel state. The stuck state pattern with which the power storage device 10 is in the series state is correlated with a charging facility (for example, a DC charging facility that can charge a power storage device with a rated voltage of 600 V to 800 V) corresponding to charging of the power storage device 10 in the series state. The storage device of the ECU 100 stores information (guidance information) for guiding a user to the charging facility correlated with each stuck-state pattern.

In Step S20, the ECU 100 performs user guidance for guiding user to the charging facility correlated with the use pattern (the stuck-state pattern set as the use pattern in Step S19) using the guidance information. The guidance may be performed using display (characters, an image, or the like) or using sound. The ECU 100 may guide a user to a charging facility by displaying information (such as the type of a charging facility) for specifying an available charging facility on the display of the display device 102 (for example, a display unit of a meter panel). The ECU 100 may display a map around the vehicle 1 on the display of the display device 102 (for example, a display unit of a smartphone) and guide a user to a charging facility correlated with the use pattern from the DC charging facilities on the displayed map. In this guidance method, for example, when the use pattern is a stuck-state pattern for a situation in which relay R1 is in a stuck open state (see FIG. 9) and the DC charging facilities 200A to 200C are located around the vehicle 1, the ECU 100 guides a user to the DC charging facilities 200B and 200C suitable for charging of the power storage device 10 in the series state.

According to the routine illustrated in FIG. 8, when one of the relays R1 to R3 has been stuck, the ECU 100 controls switching of other relays (normal relays) using the stuck-state pattern corresponding to the stuck relay. Accordingly, even when one of the relays R1 to R3 has been stuck, it is possible to make the battery modules 11 and 12 usable using other switches.

In a situation in which there is a stuck relay, charging control of the power storage device 10 can be performed basically in the same way as in the routine illustrated in FIG. 8. Since switch abnormality determination or use pattern change has been already performed, the processes (Steps S18 to S20) associated with the switch abnormality determination and the use pattern change may be skipped.

In the above-mentioned embodiment, the stuck-state patterns illustrated in FIG. 9 are used. However, the disclosure is not limited thereto and stuck-state patterns illustrated in FIG. 10 instead of the stuck-state patterns illustrated it FIG. 9 may be stored in the storage device of the ECU 100. FIG. 10 is a diagram, illustrating a second example of the stuck-state patterns.

Referring to FIG. 10, the storage device of the ECU 100 stores five types of stuck-state patterns indicating to which of the open state and the closed state other relays (normal relays) are switched when each switching relay (the relays R1, R2, and R3) has been stuck closed and six types of stuck-state patterns indicating to which of the open state and the closed state other relays (normal relays) are switched when each switching relay (the relays R1, R2, and R3) has been stuck open. The ECU 100 selects a stuck-state pattern based on the detection result in Step S18 (the detection result indicating which switching relay is stuck in which state). Note that in each case of "relay R1 is in a stuck closed state", "relay R3 is in a stuck closed state", "relay R1 is in a stuck open state", "relay R2 is in a stuck open state", and "relay R3 is in a stuck open state", two types of stuck-state patterns (switching patterns A and B) are prepared. In these cases, it can be arbitrarily set which of switching patterns A and B the ECU 100 is to select. One of switching, patterns A and B may be selected in accordance with a predetermined rule or one of switching patterns A and B may be selected in accordance with an instruction from a user.

For example, depending on a configuration of the travel driving unit mounted in the vehicle 1, in some cases, the vehicle 1 cannot be driven to travel by the power storage device 10 in the series state (the power storage device 10 with a high voltage). In such a vehicle 1, when "relay R1 is in a stuck open state", or "relay R3 is in a stuck open state" occurs and the state of the vehicle 1 is switched from the left-alone period to during traveling, the power storage device 10 may be set to the second single-connected state or the first single-connected state using switching pattern B and the vehicle 1 may be made to travel using the power storage device 10 in the second single-connected state or the first single-connected state (for example, travel in a limp-home mode). Accordingly, the vehicle can travel autonomously even in a situation in which there is a stuck relay.

One of switching patterns A and B may be selected based on the specifications (for example, the maximum voltage) of the DC charging facility such that the rated voltage of the power storage device 10 is a voltage suitable for the DC charging facility.

A predetermined charging facility (a charging facility to which a user is guided by the user guidance) may be correlated with each stuck-state pattern illustrated in FIG. 10.

FIGS. 9 and 10 illustrate stuck-state patterns when the number of stuck relays is one. Instead of or in addition to these stuck-state patterns, stuck-state patterns when the number of stuck relays is two may be stored in the storage device of the ECU 100.

In the above-mentioned embodiment; stuck-state patterns when all the switching relays included in the power storage device 10 are stuck are prepared (see FIGS. 9 and 10). However, the disclosure is not limited thereto, and when only a specific switching relay from a plurality of switching relays included in the power storage device 10 is easily stuck, the disclosure may only store a stuck-state pattern for a situation in which the specific switching relay is stuck in the storage device.

In the routine illustrated in FIG. 8, external charging, of the power storage device 10 is always executed in the series state. However, the disclosure is not limited thereto, and the external charging of the power storage device 10 may be executed in the parallel state. FIG. 11 is a flowchart illustrating a modified example of the routine illustrated in FIG. 8. As illustrated in FIG. 11, Steps S31 and S32 may be added to the routine illustrated in FIG. 8.

Referring to FIG. 11, in this modified example, Steps S31 and S32 are performed between Steps S13 and S14. The connection mode (series/parallel) of the battery modules 11 and 12 is switched based on the specifications, of a DC charging facility by Steps S31 and S32.

In Step S13, when the maximum voltage Vmax of the DC charging facility is suitable for charging of the power storage device 10 in one of the series state and the parallel state, it is determined that the specifications of the DC charging facility is suitable for charging of the power storage device 10. That is, even when the vehicle 1 is connected to one of the DC charging facilities 200A to 200C, it is determined that the specifications of the DC charging facility is suitable for charging of the power, storage device 10.

In Step S31, the ECU 100 determines whether the maximum voltage Vmax the DC charging facility is equal to or greater than a predetermined threshold value Th1. In this modified example, the threshold value Th1 is set to 600 V. That is, when the vehicle 1 is connected to the DC charging facility 200A (with a maximum voltage of 400 V), it is determined that the maximum voltage Vmax of the DC charging facility is less than the threshold value Th1. When the vehicle 1 is connected to one of the DC charging facility 200B (with, a maximum voltage of 800 V) and the DC charging facility 200C (with a maximum voltage of 800 V), it is determined that the maximum voltage Vmax of the DC charging facility is equal to or greater than the threshold value Th1. The threshold value Th1 can be arbitrarily set. The threshold value Th1 may be a fixed value or may be variable depending on the situation of the vehicle 1 or the like.

When it is determined that the maximum voltage Vmax of the DC charging facility is equal to or greater than the threshold value Th1 (YES in Step S31), the routine transitions to Step S14 with the power storage device 10 maintained in the series state. On the other hand, when it is determined that the maximum voltage Vmax of the DC charging facility is less than the threshold value Th1 (NO in Step S31), the ECU 100 controls the relays R1 to R3 in Step S32 such that the power storage device 10 is switched to the parallel state and then the routine transitions to Step S14. Steps S14 to S21 in FIG. 11 are the same as in Steps S14 to S21 in FIG. 8.

In the embodiment and the modified examples, the switch abnormality determination and the use pattern change are performed after external charging has been completed (for example, immediately thereafter). However, the disclosure is not limited thereto, and the time at which the switch abnormality determination and the use pattern change are performed can be arbitrarily changed. At the time at which traveling of the vehicle 1 is started (for example, a time at which the state of the vehicle 1 is switched from the left-alone period to during traveling), the switch abnormality determination and the use pattern change may be performed.

The configuration illustrated in FIG. 1 may be changed depending on the type of the vehicle in which the battery system is mounted or the like. For example, the number of battery modules constituting the power storage device 10 is not limited to two and can be arbitrarily changed within a range of two or greater. For example, the power storage device 10 in the series state and the parallel state may be configured such that three or more battery modules are connected in series and in parallel.

The number of switching relays is also arbitrary. When the number of switching relays is equal to or greater than four, the stuck-state patterns in situations in which the number of stuck relays is equal to or greater than three may be stored in the storage device of the ECU 100.

In the configuration illustrated in FIG. 1, the charging relay device 30 is connected between the main relay device 20 and the PCU 40, but the charging relay device 30 may be connected between the power storage device 10 and the main relay device 20.

The embodiment disclosed therein is exemplary in all respects but is not restrictive. The scope of the disclosure includes all modifications within meanings and scopes equivalent to the disclosure.

What is claimed is:

1. A battery system comprising:
  a plurality of battery modules;
  a plurality of switches arranged in a circuit including the plurality of the battery modules, the plurality of the switches being configured to switch connection of the plurality of the battery modules between a series state and a parallel state;
  a storage device that stores a plurality of switching patterns including a normality switching pattern of each of the plurality of the switches and a first switching pattern in which the plurality of the battery modules is in a single-connected state and a second switching pattern in which the plurality of the battery modules is in the series state or the parallel state, the normality switching pattern representing which of an open state and a closed state each of the plurality of the switches is switched to, each of the first switching pattern and the second switching pattern representing which of an open state and a closed state each of the plurality of the switches other than a predetermined switch is switched to; and
  a control device configured to:
    i) control switching of each of the plurality of the switches based on the normality switching pattern;
    ii) determine whether the predetermined switch is unable to be controlled;
    iii) determine a state of the vehicle;
    iv) select one of the first switching pattern and the second switching pattern based on the state of the vehicle in response to determining that the predetermined switch is unable to be controlled; and
    v) control switching of the plurality of the switches other than the predetermined switch based on the selected switching pattern such that the plurality of the battery modules is not in a short-circuited state,
  wherein: the series state is a state in which the plurality of the battery modules is connected in series,
  the parallel state is a state in which the plurality of the battery modules is connected in parallel,
  the short-circuited state is a state in which terminals of at least one of the plurality of the battery modules is short-circuited, and
  the single-connected state is a state in which only one battery module of the plurality of battery modules forms a closed circuit in the circuit.

2. The battery system according to claim 1, wherein
  the storage device stores the following switching patterns as abnormality switching patterns including the first switching pattern and the second switching pattern:
    i) a switching pattern for each of situations in which one of the plurality of the switches is an open abnormal switch, the open abnormal switch being a switch which is in an open state and is unable to be controlled; and
    ii) a switching pattern for each of situations in which one of the plurality of the switches is a closed abnormal switch, the closed abnormal switch being a switch which is in a closed state and is unable to be controlled, wherein
  the control device is configured to, when any one of the plurality of the switches is unable to be controlled, control switches other than the one of the plurality of the switches which is unable to be controlled using a switching pattern selected from the plurality of switching patterns stored in the storage device.

3. The battery system according to claim 1, wherein:

the storage device stores a plurality of abnormality switching patterns including the first switching pattern and the second switching pattern and stores guidance information for guiding a user to a predetermined charging facility correlated with each of the plurality of abnormality switching patterns; and the control device is configured to, when any one of the plurality of switches is unable to be controlled, control switches other than the one of the plurality of the switches which is unable to be controlled using one abnormality switching pattern selected from the plurality of abnormality switching patterns stored in the storage device and guide the user to the predetermined charging facility using the guidance information.

4. The battery system according to claim 1, wherein:

the plurality of battery modules includes a first battery module and a second battery module;

the plurality of switches includes a first relay that is disposed on a first electric wire connecting a positive electrode of the first battery module and a positive electrode of the second battery module, a second relay that is disposed on a second electric wire connecting the positive electrode of the first battery module and a negative electrode of the second battery module, and a third relay that is disposed on a third electric wire connecting a negative electrode of the first battery module and the negative electrode of the second battery module;

a first node to which the first electric wire and the second electric wire are connected is located closer to the positive electrode of the first battery module than the first relay; and a second node to which the second electric wire and the third electric wire are connected is located closer to the negative electrode of the second battery module than the third relay.

5. The battery system according to claim 1, wherein:

the state of the vehicle includes one of a ready-on state, a ready-off state, and a being charged state.

* * * * *